United States Patent
Prix

(10) Patent No.: US 8,387,759 B2
(45) Date of Patent: Mar. 5, 2013

(54) BLOCKING MECHANISM

(75) Inventor: Daniel Prix, Ebental (AT)

(73) Assignee: Magna Powertrain AG & Co KG, Lannach (AT)

( * ) Notice: Subject to any disclaimer, the term of this patent is extended or adjusted under 35 U.S.C. 154(b) by 81 days.

(21) Appl. No.: 13/186,534

(22) Filed: Jul. 20, 2011

(65) Prior Publication Data

US 2012/0018259 A1 Jan. 26, 2012

Related U.S. Application Data

(60) Provisional application No. 61/367,170, filed on Jul. 23, 2010.

(30) Foreign Application Priority Data

Apr. 28, 2011 (DE) .......................... 10 2011 018 862

(51) Int. Cl.
*B60T 1/06* (2006.01)

(52) U.S. Cl. ........... 188/69; 188/31; 188/265; 74/411.5; 192/219.5

(58) Field of Classification Search ............. 188/31, 188/69, 82.7, 265, 156–164; 74/411.5, 473.36; 192/219.5

See application file for complete search history.

(56) References Cited

U.S. PATENT DOCUMENTS

| | | | | |
|---|---|---|---|---|
| 7,828,124 B2* | 11/2010 | Sano et al. | ..................... | 188/156 |
| 8,037,972 B2* | 10/2011 | Fujita | ............................... | 188/31 |
| 8,056,683 B2* | 11/2011 | Usui | ............................... | 188/31 |
| 8,240,448 B2* | 8/2012 | Hongawara et al. | ........ | 192/219.5 |
| 2002/0092710 A1* | 7/2002 | Oppitz et al. | .................... | 188/69 |
| 2009/0173584 A1* | 7/2009 | Reichert | .......................... | 188/31 |
| 2012/0138419 A1* | 6/2012 | Kim et al. | .................. | 192/219.5 |

FOREIGN PATENT DOCUMENTS

| | | |
|---|---|---|
| DE | 10131735 | 1/2003 |
| DE | 10144056 | 3/2003 |
| DE | 10144063 | 3/2003 |
| DE | 10144058 | 1/2005 |
| DE | 102006030998 | 1/2008 |

* cited by examiner

*Primary Examiner* — Christopher Schwartz

(74) *Attorney, Agent, or Firm* — Dickson Wright, PLLC

(57) ABSTRACT

The present invention relates to a blocking mechanism for a parking lock of a shaft in a motor vehicle. The blocking mechanism includes a pawl pivotable about a pivot axis and which, in a blocked position, engages into at least one latch cut-out of a ratchet wheel connected to the shaft. The blocking mechanism includes an actuating mechanism having an actuating device for moving an actuation slider. The pawl is pivotable by a movement of the actuation slider. The actuation slider includes a first U-shaped component and a second U-shaped component which each have two side sections and a transverse section connecting the side sections. The first component and the second component are plugged into one another in opposite directions such that the transverse section of the one component at least partly closes the open end of the U shape of the component and vice versa.

21 Claims, 3 Drawing Sheets

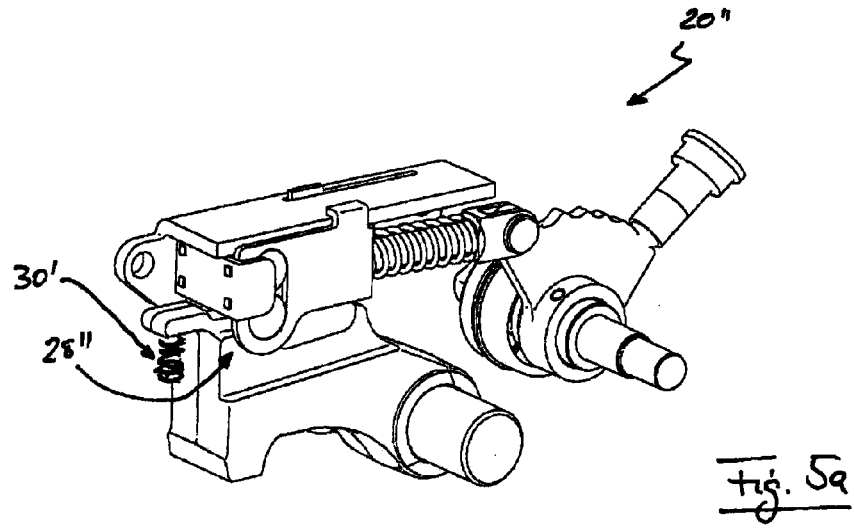
Fig. 5a
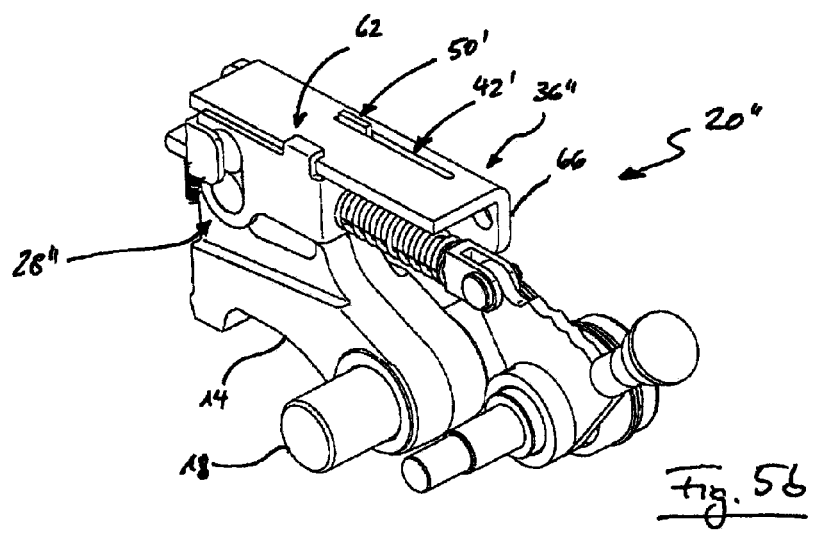
Fig. 5b
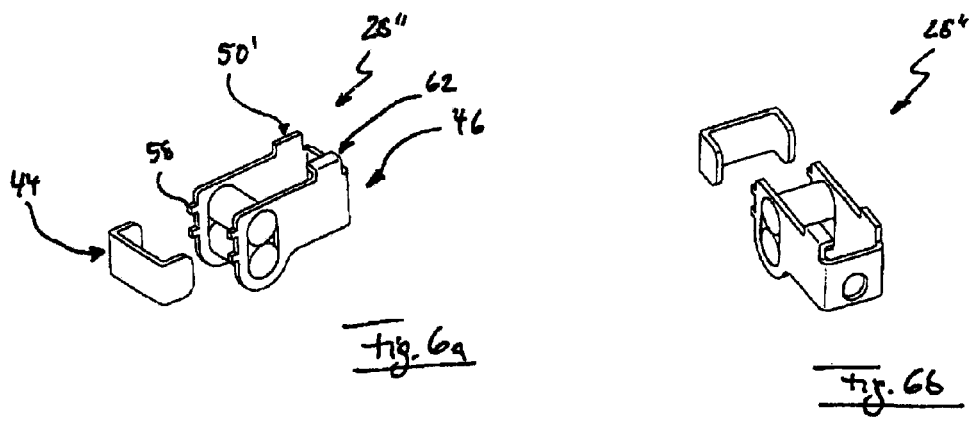
Fig. 6a
Fig. 6b

BLOCKING MECHANISM

CROSS-REFERENCE TO RELATED APPLICATIONS

This application claims the benefit and priority of German Patent Application No. 10 2011 018 862.2 filed Apr. 28, 2011 and U.S. Provisional Application No. 61/367,170 filed Jul. 23, 2010. The entire disclosures of the above-applications are incorporated herein in their entirety by reference.

FIELD

The present invention relates to a blocking mechanism for the rotationally fixed locking of a shaft.

BACKGROUND

This section provides background information related to the present disclosure which is not necessarily prior art.

Such blocking mechanisms are used, for example, as parking locks to secure a motor vehicle when stationary. For this purpose, for example, a transmission shaft of a motor vehicle is rotationally fixedly locked. Parking locks are in particular used in motor vehicles having automatic transmissions and/or in hybrid vehicles or electric vehicles.

On the actuation of the parking lock, substantial loads on the components involved can occur. If the vehicle is still rolling, for example, on the actuation of the parking lock, a torque is applied at the shaft of the vehicle to be locked. The components of the parking lock have to take up the forces related thereto to effect the reliable locking of the shaft.

SUMMARY

This section provides a general summary of the disclosure and is not a comprehensive disclosure of its full scope or all of its features.

It is therefore an object of the present invention to provide a blocking mechanism which can take up high loads and which can at the same time be manufactured inexpensively and which has a compact construction.

The blocking mechanism in accordance with the invention has a pawl which is pivotable about a pivot axis and which, in a blocked position, engages into at least one latch cut-out of a ratchet wheel connected to the shaft. An actuating mechanism is furthermore provided which has an actuating device for moving an actuation slider. The pawl is pivotable by a movement of the actuation slider. The actuation slider includes a first U-shaped component and a second U-shaped component which each have two side sections and a transverse section connecting the side sections. The first component and the second component are plugged into one another in opposite directions such that the transverse section of the one component at least partly closes the open end of the U shape of the other component and vice versa.

In other words, the actuation slider has at least two components which are each designed in U shape. They can be produced separately in a simple manner. The installation of the actuation slider is possible in a simple manner since the first component and the second component are only plugged into one another in the simplest case. For this purpose, for example, the first U-shaped component is placed onto the limbs of the second U-shaped component formed by the side sections such that the transverse section of the first component at least partly covers the open end of the U shape of the second component. In this state, the transverse section of the two components can extend parallel to one another, for example, with their spacing being defined by the length of the side sections of at least one of the components. The side sections in particular contact one another in parallel at least sectionally in the installed state of the actuation slider.

The above-described embodiment of the actuation slider not only allows a simple installation, but also results in a stable construction of the actuation slider since the U-shaped components are mutually stabilized by the plugging into one another.

The first and/or the second component can be made in one piece to keep the manufacturing costs of the blocking mechanism low. Both components are preferably made in one piece.

In accordance with an embodiment which is favorable from a technical manufacturing aspect and which moreover provides a high stability of the actuation slider, the side sections and the transverse section each include an angle of approximately 90.degree. A body having a substantially rectangular shape is produced by the plugging into one another of the two components in opposite directions—at least in a plane defined by the U shapes of the components.

The components can generally have similar longitudinal extents in the longitudinal direction of the U shape. Provision can, however, also be made that one of the components has an elongated U shape, whereas the other component has a comparatively "flat" U. One of the two components, for example, forms a base body by its U shape which is closed by the other component having a bracket-like U shape—for instance, a shape which has comparatively short side sections in comparison with the length of the transverse section.

The first component in particular completely engages around the second component in the longitudinal extent of the actuation slider. I.e. one of the components is—at least viewed in the longitudinal direction of the actuation slider—arranged in the interior of the U-shape of the first component.

The first and the second components can be fixedly connected to one another by a clamping effect exerted by one of the components on the other component. Provision can additionally or alternatively be made that the first component and the second component are fixedly connected to one another by stamping. Other kinds of connection, for example weld connections, can likewise be used.

To be able to guide the actuation slider reliably during the movement and/or to be able to restrict its movement, a guide rail can be provided which cooperates with at least one guide element formed at the first component and/or at the second component. The guide rail is in particular arranged spatially fixedly and can act as a counter-bearing at which the actuation slider is supported during its movement to effect a pivoting of the pawl. The guide rail is in particular arranged at the side of the actuation slider remote from the pawl.

The guide rail can have a side wall section which extends at right angles from a section of the guide rail supporting the actuation slider in the direction toward the pawl in order thus also to provide a guidance in the lateral direction. The side wall section can also serve for stiffening the guide rail and/or for its fastening.

The at least one guide element at at least one of the components is in particular provided at one of the side sections. It can also be arranged at a prolongation which is provided at an end of at least one of the side sections remote from the transverse section. The guide element, for example, engages laterally around the guide rail sectionally. The guide element can be made in L-shape or hook-shape for this purpose.

The guide element can be guided at least partly in a guide device of the guide rail. The guide device is, for example, a recess, a cut-out, an elongate hole, a groove or a slit. It is understood that the guide element has a corresponding complementary design.

In accordance with an embodiment, the actuation slider cooperates via at least one roller with a control cam formed at the pawl. An intermediate roller can additionally be provided which rolls off at the guide rail on a movement of the actuation slider and which is in contact with the roller cooperating with the control cam. The roller cooperating with the control cam and/or the intermediate roller are in particular supported in the first component and/or in the second component. The support can take place, for example, by an elongate hole or a U-shaped slit formed at the first component and/or at the second component.

The actuating device can include an eccentric part or a lever which converts a rotary movement into a pushing movement acting on the actuation slider.

A damping device via which the actuating device acts on the actuation slider can be provided to set the latching characteristics of the pawl. The damping device is a spring device, for example. The damping device also prevents damaging tensioning of the involved components on an "out-of-mesh" position of the pawl and of the ratchet wheel which prevents a latching of the pawl into the blocking position. In this situation, the damping device at least partly takes up the actuation movement produced by the actuating device and outputs it again when the above-described "out-of-mesh" position is cancelled again and a latching is again possible.

The actuating device can be pivotally connected to a guide bar which projects through an opening in the transverse wall of one of the components into the interior of the actuation slider to provide additional guidance of the movement of the actuation slider.

Further embodiments of the invention are set forth in the claims, in the description and in the enclosed drawings.

DRAWINGS

The present invention will be described in the following purely by way of example with reference to advantageous embodiments and to the enclosed drawings. There are shown:

FIGS. 5a and 5b illustrate a third embodiment of the blocking mechanism in accordance with the invention; and FIGS. 6a and b are different perspective views of the third embodiment of the actuation slider associated with the blocking mechanism shown in FIGS. 5a and 5b.

DETAILED DESCRIPTION

Figure 1:
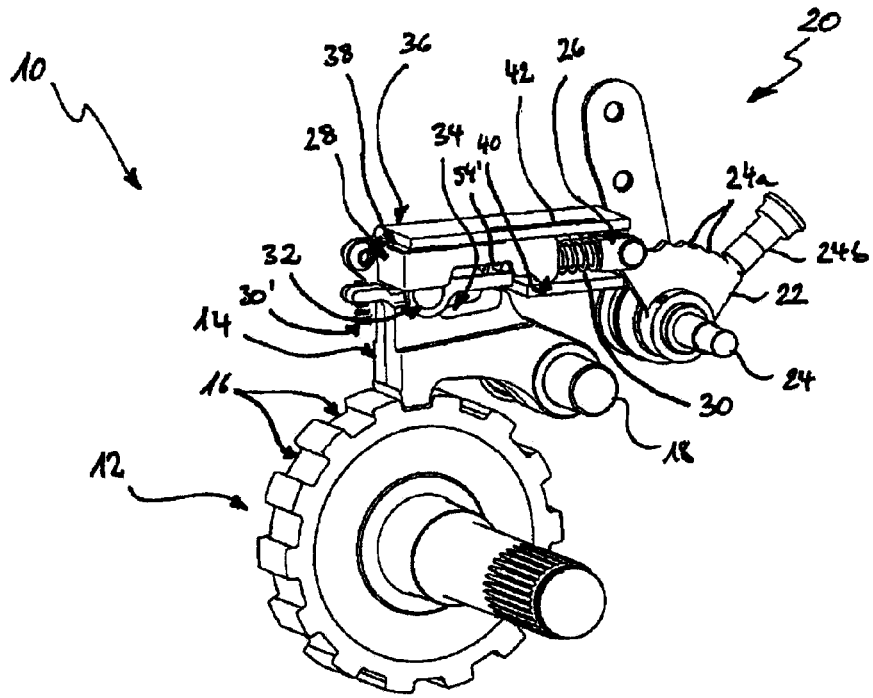
FIG. 1 illustrates an embodiment of the blocking mechanism in accordance with the invention.

FIG. 1 shows a parking lock 10 which is provided, for example, for locking an intermediate shaft, not shown, of a transmission of a motor vehicle which is connected to an electric motor of an electric vehicle or of a hybrid vehicle. It is understood that the parking lock 10 can also be used in other application areas such as in a conventional automatic transmission. The parking lock 10 serves for the rotationally fixed securing of the intermediate shaft. Ultimately, it is rotationally fixedly coupled to a transmission housing, which has the result that the transmission is blocked and that the vehicle is secured in a parked state.

The parking lock 10 includes a ratchet wheel 12 which is connected to the intermediate shaft directly or indirectly via a damping element—for example a rubber component or a plastic component, a torsion spring or similar—for damping peak loads. A blocking position for the parking lock 10 is shown in FIG. 1 in which a pawl 14 engages into latch cut-outs 16 of the ratchet wheel 12. The pawl 14 is arranged pivotably about a pivot axis 18.

An actuating mechanism 20 is provided to produce a pivoting movement of the pawl 14. The actuating mechanism 20 includes a latching disk 22 which acts as an eccentric part and which is pivotable about an actuation shaft 24, for example, by means of a Bowden cable. The latching disk 22 has latch cut-outs 24a into which a latching mechanism 24b—it e.g. includes a spring-loaded ball—engages to define specific positions of the parking lock 10.

The latching disk 22 is connected to an actuating bar 26 which, on the one hand, represents a guide for an actuation slider 28 for pivoting the pawl 14 and, on the other hand, forms an abutment for a spring 30. A rotational movement of the shaft 24 is converted into a movement in translation of the actuation slider 28 by the latching disk 22, the bar 26 and the spring 30.

The actuation slider 28 supports a roller 32 which cooperates with a control cam 34 which is provided at a side 12 of the pawl 14 remote from the ratchet wheel 12. A movement in translation of the actuation slider 28 from an unblocked position into the blocking position shown in FIG. 1 results in a rolling off of the roller 32 on the control cam 34 which becomes steeper in its part at the left in FIG. 1. Since the actuation slider 28 can only be moved in translation by the effect of a spatially fixedly arranged guide rail 36, the movement of the actuation slider 28 to the left effects a pivoting of the pawl 14 until it engages into one of the cut-outs 16 of the ratchet wheel 12.

For an unblocking of the parking lock 10, the actuation slider 28 is moved to the right out of the position shown in FIG. 1. A restoration spring 30' which is supported at a housing component, not shown, urges the pawl 14 away from the ratchet wheel 12 so that it is released again.

The guide rail 36 has a shape of a U lying on its side in its region at the right in FIG. 1. In the left region, the limb of the U facing the pawl 14 is missing. The guide rail 36 serves for the guidance of the actuation slider 28 and provides that it only carries out the movement in translation required for the actuation of the parking lock 10. It also represents a kind of counter-bearing at which the actuation slider 28 is supported, while the roller 23 rolls off at the control cam 34. An intermediate roller 38 which can hardly be recognized in FIG. 1 is provided to reduce the friction between the actuation slider 28 and the guide rail 36.

The guidance of the actuation slider 28 in the guide rail 36 takes place via guide noses 40 which cooperate with a limb of the guide rail 36 facing the pawl 14 or with the limb disposed opposite this limb. A slit 42 is formed at the upper side of the guide rail 36 and receives a guide element explained in more detail in the following.

FIGS. 2a to 2d show the actuation slider 28 in different perspective views. The actuation slider 28 includes two components 44, 46 which each have the shape of a U in a plan view—i.e. in a direction perpendicular to the direction of translation of the actuation slider 28 and perpendicular to an axis of rotation of the ratchet wheel 12 or at the pivot axis 18. The component 46 is inserted into the component 44 in the opposite direction so that the Us close one another. Together, the components 44, 46 form a box-shaped assembly which—viewed in a plan view—has a rectangular base shape.

The components 44, 46 each have side sections 44a or 46a which are each connected to one another by a cross-section 44b or 46a. In an installed state, the side sections 44a, 46a contact one another in parallel, whereas the transverse sections 44b, 46b close the open end of the U shape of the respective other component 46 or 44.

In an installed state, the component 44 engages around the component 46 in the longitudinal direction of the actuation slider 28. Figuratively speaking, the U shape of the component 44 completely receives the U shape of the component 46. The two components 44, 46 are reliably connected to one another by a clamping effect which is exerted by the component 44 on the component 46.

The side sections 44a each have prolongations 48 at the end remote from the transvers section 44b at which prolongations the guide noses 40 already named above are formed. Furthermore, one of the side sections 44a has a guide projection 50 which engages into the slit 42 already described in connection with FIG. 1 to guide the actuator slider 28 during the movement in translation and to limit the movement in translation.

Figure 2A:
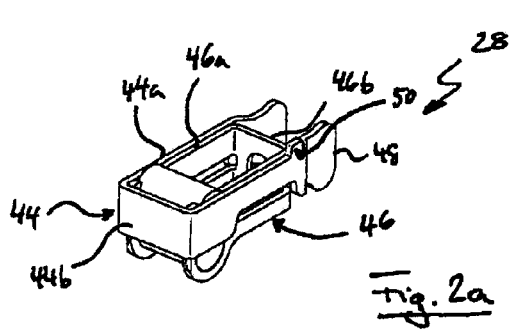
FIGS. 2a-2d are different perspective views of an actuation slider associated with the blocking mechanism shown in FIG. 1.
Figure 2B:
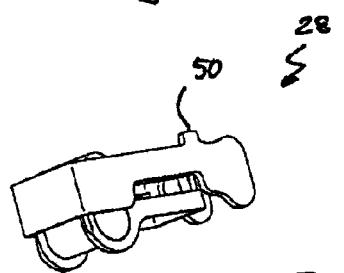
Figure 2C:
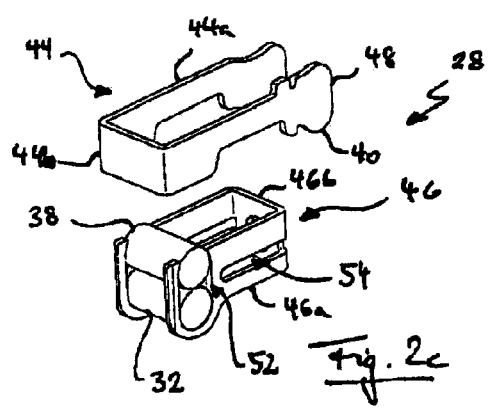

FIG. 2c shows the actuation slider 28 in an exploded view, whereby the view of the roller 32 and of the intermediate roller 38 is improved. They are supported in U-shaped slits 52 provided in the slide sections 46b of the component 46. The component 46 has cut-outs 54 which serve for the guidance of a transverse bar 54' connected to the actuating bar 26 (see FIG. 1).

Figure 2D:
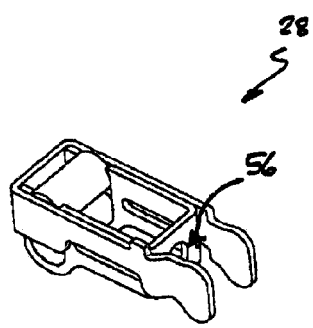

An opening 56 can be recognized in FIG. 2d through which the actuating bar 26 projects into the interior of the rectangular base body of the actuation slider 28 formed by the components 44, 46 to exert a guiding function.

It is understood that the most varied embodiments of the actuation slider 28 and of the guide rail 36 can be imagined which likewise enable a reliable actuation of the parking lock 10.

Figure 3:
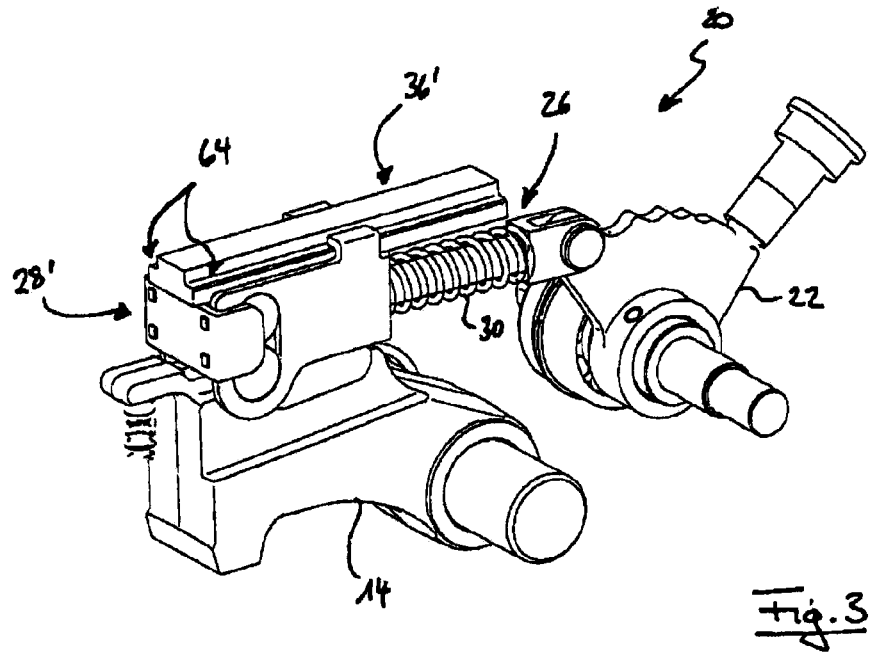
FIG. 3 illustrates a second embodiment of the blocking mechanism in accordance with the invention.
Figures 4A, 4B, 4C, 4D:
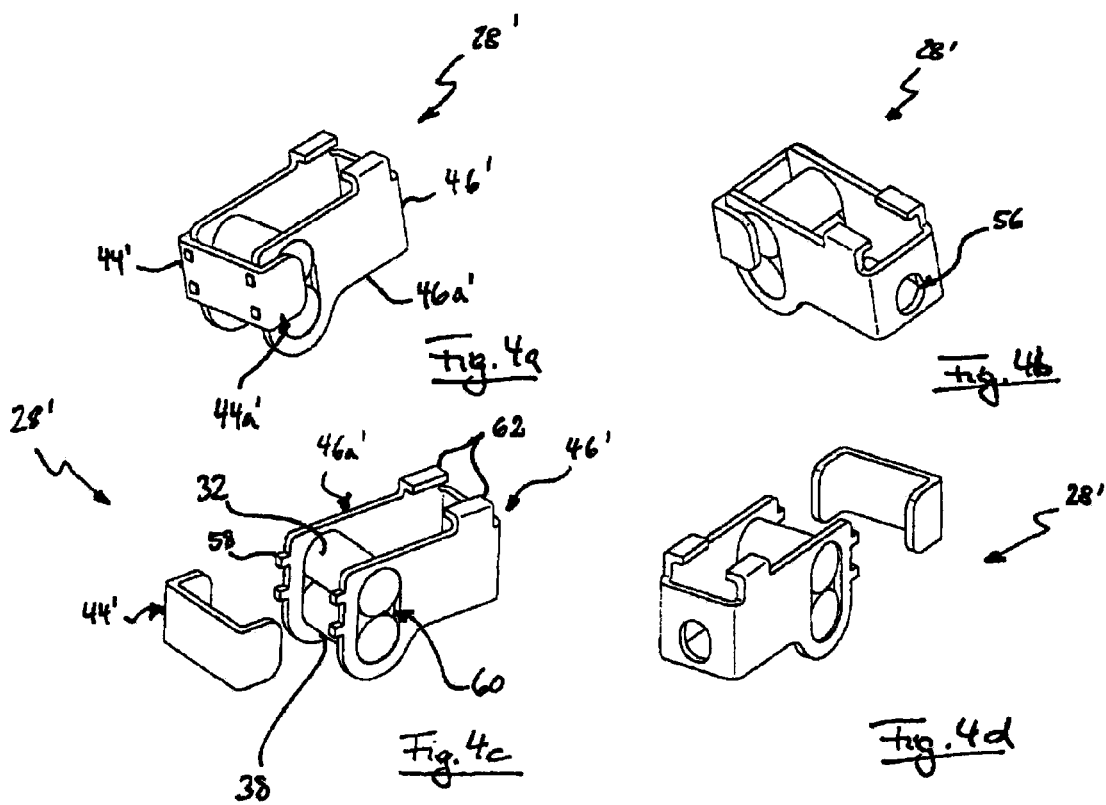
FIGS. 4a-4d are different perspective views of a second embodiment of the actuation slider associated with the blocking mechanism shown in FIG. 3.

A further embodiment 20' of the actuating mechanism is shown by way of example in FIG. 3. The pawl 14 and the elements associated with the latching disk 22, including the actuating bar 26 and the spring 30 are substantially the same as the corresponding components shown in FIG. 1. The actuating mechanism 20', however, includes an actuation slider 28' which has a somewhat different design. The actuation slider 28' admittedly likewise has two U-shaped components 44', 46'; however, the component 44' does not completely engage around the component 46', as can in particular be seen from FIGS. 4a to 4d. The side sections 44a' of the component 44' are made substantially shorter than the side sections 46a' of the component 46'. In addition, the rollers 32, 38 in the actuation slider 28' are, unlike the embodiment of the actuation slider 28, arranged in elongate holes 60 formed in the side sections 46a' of the component 46'.

On the installation of the actuation slider 28', the component 44' is placed onto the open end of the component 46', with plug-in elements 58 of the component 46' penetrating into corresponding openings (not shown) of the component 44'. The connection can be secured in that a stamping process is carried out.

The guidance of the actuation slider 28' by a guide rail 36' takes place by means of guide hooks 62 which are arranged at the side sections 46a' and which partly engage around the guide rail 36' at both sides. In this respect, they are arranged in grooves 64 of the guide rail 36' shaped in a complementary manner.

An embodiment 28" of the actuation slider is shown in FIGS. 5a and 5b which is to a large extent, in particular with respect to the embodiment of the U shape of the components 44', 46', substantially the same as the actuation slider 28', as in particular FIGS. 6a and 6b show. The guidance of the actuation slider 28", however, takes place in a somewhat different manner. Only one guide hook 62 is provided which laterally engages around the guide rail 36". A guide groove 64 is not provided. The second guide hook 62 of the actuation slider 28' is replaced with a guide projection 50' which engages into a slit 42'. It is thereby possible to provide the guide rail 36" with a side wall 66 which extends perpendicular to the direction of the movement in translation of the guide slider 28" and perpendicular to the pivot axis 18 of the pawl 14. This increases the stability of the guide rail 36" and facilitates their fastening. In addition, the side wall 66 provides an additional lateral guide for the actuation slider 28".

REFERENCE NUMERAL LIST 10 parking lock
12 ratchet wheel
14 pawl
16 latch cut-out
18 pivot axis
20, 20' actuating mechanism
22 latching disk
24 actuation shaft
24a latch cut-out
24b latching mechanism
26 actuating bar
28, 28', 28" actuation slider
30 spring
30' restoration spring
32 roller
34 control cam
36, 36', 36" guide rail
38 intermediate roller
40 guide nose
42, 42' slit
44, 46, 44', 46', 44", 46" component
44a, 46a, 44a', 46a side section
44b, 46b transverse section
48 prolongation
50, 50' guide prolongation
52 slit
54 cut-out
56 opening
58 plug-in element
60 elongate hole
62 guide hook
64 groove
66 side wall

What is claimed is:

1. A blocking mechanism for the rotationally fixed locking of a shaft, comprising: a pawl that is pivotable about a pivot axis; a ratchet wheel connected to the shaft having at least one latch cut-out disposed proximate the pawl such that the pawl, in a blocked position, engages the at least one latch cut-out of the ratchet wheel connected to the shaft; and an actuating mechanism including an actuation device for moving an actuation slider, wherein the pawl is pivotable by a movement of the actuation slider; the actuation slider includes a first U-shaped component and a second U-shaped component which each have two side sections and a transverse section connecting the side sections; and the first U-shaped component and the second U-shaped component are plugged into one another in opposing directions such that the transverse section of the first U-shaped component at least partly closes an open end of the second U-shaped component.

2. The blocking mechanism in accordance with claim 1, further comprising a guide rail that cooperates with at least one guide element formed at at least one of the first and second U-shaped component to at least one of guide and limit the movement of the actuation slider.

3. The blocking mechanism in accordance with claim 2, wherein the guide rail is arranged at a side of the actuation slider remote from the pawl.

4. The blocking mechanism in accordance with claim 2, wherein the guide rail has a side wall section extending at a right angle from the guide rail in a direction toward the pawl.

5. The blocking mechanism in accordance with claim 2, wherein the guide element is arranged at one of the side sections or at a prolongation that is provided at an end of the side sections remote from the transverse section.

6. The blocking mechanism in accordance claim 2, wherein the guide element laterally engages around the guide rail at least sectionally.

7. The blocking mechanism in accordance with claim 2, wherein the guide element is guided at least partly in a guide device of the guide rail.

8. The blocking mechanism in accordance with claim 1, wherein the actuation slider cooperates via at least one roller with a control cam formed at the pawl.

9. The blocking mechanism in accordance with claim 8, wherein the roller cooperating with at least one of the control cam and the intermediate roller are supported in at least one of the first and second U-shaped components.

10. The blocking mechanism in accordance with claim 9, wherein the roller cooperating with at least one of the control cam and the intermediate roller are supported in at least one of the first and second U-shaped components in at least one of an elongate hole and a U-shaped slit.

11. The blocking mechanism in accordance with claim 8, wherein an intermediate roller is provided which rolls off at the guide rail on a movement of the actuation slider and which is in contact with the roller cooperating with the control cam.

12. The blocking mechanism in accordance with claim 1, wherein the actuation device acts on the actuation slider via a damping device.

13. The blocking mechanism of claim 12, wherein the damping device is a spring device.

14. The blocking mechanism in accordance with claim 1, wherein at least one of the first U-shaped component and the second U-shaped component is made in one piece.

15. The blocking mechanism in accordance with claim 1, wherein the side sections and the transverse section of at least one of the first U-shaped component and the second U-shaped component each include an angle of approximately 90°.

16. The blocking mechanism in accordance claim 1, wherein the first component completely engages around the second component in the longitudinal extent of the actuation slider.

17. The blocking mechanism in accordance with claim 1, wherein the first component and the second component are fixedly connected to one another by a clamping effect exerted by one of the components onto the other component.

18. The blocking mechanism in accordance with claim 1, wherein the first U-shaped component and the second U-shaped component are fixedly connected to one another by stamping.

19. The blocking mechanism in accordance claim 1, wherein the actuation device includes an eccentric part or a lever which converts a rotational movement into a pushing movement that acts onto the actuation slider.

20. The blocking mechanism in accordance with claim 1, wherein the actuation device is pivotally connected to a guide bar which projects through an opening in the transverse section of one of the components into the interior of the actuation slider.

21. A park lock mechanism for use in a motor vehicle, comprising:
a rotatable shaft;
a ratchet wheel connected to the shaft and having at least one latch cut-out;
a pawl pivotable about a pivot axis for movement between a first position released from engagement with the latch cut-out on the ratchet wheel and a second position in latched engagement with the latch cut-out on the ratchet wheel; and
an actuating mechanism configured to selectively pivot the pawl between its first and second positions, the actuating mechanism including a latch disk pivotable about a second pivot axis, an actuating bar having a first end coupled to the latch disk, a guide rail surrounding at least a portion of the actuation bar and operable to convert pivotal movement of the latch disk into translational movement of the actuating bar, an actuation slider disposed at a second end of the actuating bar and slidingly retained in the guide rail, the actuation slider including first and second U-shaped components arranged in opposing directions such that a transverse end section of the first U-shaped component at least partly closes an open end of the second U-shaped component and the end of the actuating bar extends through a bore in a transverse end section of the second U-shaped component, and a roller supported by the second U-shaped component and engaging a cam formed on the ratchet wheel.

* * * * *